UNITED STATES PATENT OFFICE.

WILLIAM R. ALBERTSON, OF WORCESTER, AND NATHANIEL B. BRIGGS, OF ROCKLAND, MASSACHUSETTS; SAID BRIGGS ASSIGNOR TO SAID ALBERTSON.

COLORING AND BURNISHING COMPOSITION.

SPECIFICATION forming part of Letters Patent No. 501,311, dated July 11, 1893.

Application filed March 1, 1893. Serial No. 464,247. (No specimens.)

*To all whom it may concern:*

Be it known that we, WILLIAM R. ALBERTSON, residing at Worcester, in the county of Worcester, and NATHANIEL B. BRIGGS, residing at Rockland, in the county of Plymouth, State of Massachusetts, both citizens of the United States, have invented a new and useful Coloring and Burnishing Composition for Boots and Shoes, of which the following is a specification sufficiently full, clear, and exact to enable persons skilled in the art to which this invention appertains to make and use the same.

This invention relates to compositions used upon the soles, heels, edges and other parts of boots and shoes to dye, color or black the surfaces thereof, and to impart thereto, when acted upon by friction of the usual burnishing tools or appliances, the desired finish and luster.

The object of our present invention is to provide a coloring dye or blacking composition that will give a strong permanent color, that will dry readily upon the surfaces to which it is applied, that can be easily polished or burnished when in dry condition, affording a high degree of luster or a fine finish, and which will retain its gloss or finish without liability to fade, deteriorate or change color by dampness or exposure while the goods to which it is applied are awaiting sale; nor to stain or be washed out by contact with moisture.

Our invention consists in the improved composition which we will now proceed to describe.

The ingredients and preferred quantities thereof for producing one gallon of our improved coloring and burnishing composition in liquid solution and of black color, are as follows: We take of soap, preferably Conti's white soap, one and one-fourth ounces; of Brazil or carnauba wax ten ounces; gum shellac, five ounces; borax, one and one-half ounces; dextrine, four ounces; aniline black, six ounces; fish glue liquefied by acetic acid, two and one-half ounces; water, about three quarts; chromic acid or other suitable acid, three-tenths ounce. In compounding these ingredients the preferred method is to separately form sub-mixtures, viz: first, of the soap and wax with about one quart of water; melt and dissolve by application of heat; second, of the gum shellac and borax dissolved in about one pint of water; third, of the dextrine dissolved in about one pint of water; fourth, of the aniline color in about one quart of water, and fifth, of the chromic or other equivalent acid in about one quart of water. The first, second and third of these sub-mixtures are put together, heated, and thoroughly incorporated by mechanical agitation, the fish glue being then added thereto and properly stirred into the mixture. The dissolved aniline black is then put in and after its thorough incorporation the chromic or other suitable acid is added thereto, the whole producing a non-alkaline or acid composition, liquid solution or blacking that gives an acid indication when tested chemically.

This composition is a comparatively thin liquid that flows freely from a brush or sponge, spreads easily upon the surfaces to which it is applied, dries quickly without becoming to a great extent absorbed by the leather, giving an exceedingly strong, deep, raven black of uniform density, which upon application of the usual hot burnishing iron, brush or other suitable polishing instrument develops a fine smooth finish and brilliant luster or gloss without scratching or throwing off dust, and with but little labor; producing a color and finish that retains its fine surface and deep black polish, which is not subject to tarnish by handling or exposure to dampness while the goods to which the composition is applied are on sale.

The composition herein specified being an acidulated mixture, and having the dissolved soap and wax incorporated therein, affords the advantages of fast color, self-lubrication without greasiness, and the desirable wax-polish without requiring the independent application of wax to the work subsequent to the blacking operation, as heretofore practiced.

As an equivalent for carnauba wax as here-in employed, other suitable varieties of wax can in some instances be used, if desired, viz: those known in the market under the names of myrtle or bayberry wax, Chinese wax, Japanese, paraffine and beeswax; but a less degree of luster is attained when beeswax is used than with the first named variety, or those belonging to the class of myrtle waxes.

While we prefer Conti's white soap as an ingredient, it may in some instances be more convenient to employ, as an equivalent, some other kind of soap; a suitable kind being that known in the market as "White Horse" soap, or soaps of similar nature; preferably soaps formed from vegetable oils, as it is essential that the soap be of a fine hard quality.

We claim—

1. The improved burnishing composition hereinbefore described, comprising an acidulated solution containing dissolved soap and wax therein and a coloring material, as set forth.

2. The improved coloring and burnishing composition hereinbefore described, comprising a solution containing dissolved soap and wax therein, a coloring material and chromic acid, as set forth.

3. A coloring and burnishing composition composed of soap, wax, shellac, borax, dextrine, glue, water, a coloring material and chromic acid combined in solution in proportions substantially as set forth.

Witness our hands this 25th day of February, A. D. 1893.

WM. R. ALBERTSON.
NATHANIEL B. BRIGGS.

Witnesses:
J. L. BAILEY,
CHAS. W. ALBERTSON.